United States Patent [19]

Eberle

[11] 4,396,692
[45] Aug. 2, 1983

[54] VARIABLE SIDE TERMINAL FOR USE IN A STORAGE BATTERY

[75] Inventor: William J. Eberle, Reading, Pa.

[73] Assignee: General Battery Corporation, Reading, Pa.

[21] Appl. No.: 215,156

[22] Filed: Dec. 11, 1980

[51] Int. Cl.³ .............................................. H01M 2/02
[52] U.S. Cl. .................................................. 429/179
[58] Field of Search ........................ 429/179, 178, 121

[56] References Cited

U.S. PATENT DOCUMENTS

| 3,632,450 | 1/1972 | Coffey | 136/135 |
| 3,711,335 | 1/1973 | Daniel | 136/135 |
| 3,928,079 | 12/1975 | Jennings et al. | 136/135 |
| 4,143,215 | 3/1979 | Mocas | 429/179 |
| 4,150,202 | 4/1979 | Tiegel | 429/179 |
| 4,154,907 | 5/1979 | Crow | 429/179 |

Primary Examiner—Charles F. LeFevour
Attorney, Agent, or Firm—Benasutti and Murray

[57] ABSTRACT

A side terminal for a side terminal battery which may be varied for use as a flat side terminal or a post side terminal.

6 Claims, 7 Drawing Figures

VARIABLE SIDE TERMINAL FOR USE IN A STORAGE BATTERY

BACKGROUND OF THE INVENTION

1. Field of the Invention

The instant invention is intended for use in the field of lead acid storage batteries. The disclosed invention is intended primarily for use in the forming and charging of side terminal batteries; however, means are provided for in service use of the terminal.

The side terminal battery differs from the top terminal battery in that side terminal batteries do not have the commonly known terminal posts protruding beyond the upper surface of the battery case. Connections to side terminal batteries are generally achieved through a fastening means which is secured to threaded means provided in a terminal for drawing a battery cable into intimate contact with the terminal in the side wall of the battery. There are some applications of side terminal batteries which do require a post terminals, like the top terminal battery, and connections are made by means of a clamp or post collar arrangement similar to top terminal connections.

2. Description of the Prior Art

The most common prior art device for forming and charging side terminal batteries, is an adaptor which is configured to look much like the post, negative or positive, which protrude from the top of a common top terminal battery. The adaptor has a bolt or fastening means molded therein which is used to secure the adaptor to the side terminal. The purpose is to draw the adaptor and side terminal into intimate contact. The adaptor must be brought into intimate contact with the side terminal so as to avoid losses in charging and forming energy.

A second prior art device, as disclosed in U.S. Pat. No. 3,607,441, is a molded two piece side terminal, which is intended as a terminal carrier to facilitate handling and positioning of the terminal during processing and then discarded after the battery is finished.

This second prior art device basically comprises an integral post and spool-like arrangement which is molded with the side terminal. A claw like adaptor cable is affixed to the spool portion of the temporary terminal during forming and charging operations. When the battery has been fully formed and is ready for shipping, the spool-like portion of the terminal is removed.

SUMMARY OF THE INVENTION

The disclosure sets forth a temporary side terminal which is cast integrally with the permanent side terminal. The temporary side terminal is primarily used in the forming and charging operations during the manufacture of a side terminal battery. The temporary side terminal may be made permanent by means of a plug means which will render the battery suitable for use as a side terminal post battery.

Prior to shipping the side terminal battery to the customer, the manufacturer, according to end use, would install the plug or remove the temporary side terminal by machining, sawing, buffing or any of the other various methods available for removing metals.

The temporary side terminal of the instant invention is completely compatible with equipment which is presently installed in battery manufacturing operations for the manufacture of top terminal batteries. No special adaptor or modification is necessary in the forming and charging operation regardless of whether the battery to be produced is a top post terminal, side flat terminal or side post terminal battery.

It is an object of the instant invention to provide a temporary side terminal which is compatible with the equipment used in charging and forming top terminal batteries.

It is an object of the instant invention to provide a side terminal battery which does not have an energy loss associated with adapting standard top terminal equipment to the side terminal use.

It is an object of the instant invention to provide a side terminal battery having a side terminal usable as either a flat side terminal or a terminal post battery.

DESCRIPTION OF THE PREFERRED EMBODIMENT

The description of the preferred embodiment shall be set forth with reference to the attached figures wherein the numerals refer to like parts in all figures.

Figure 1:
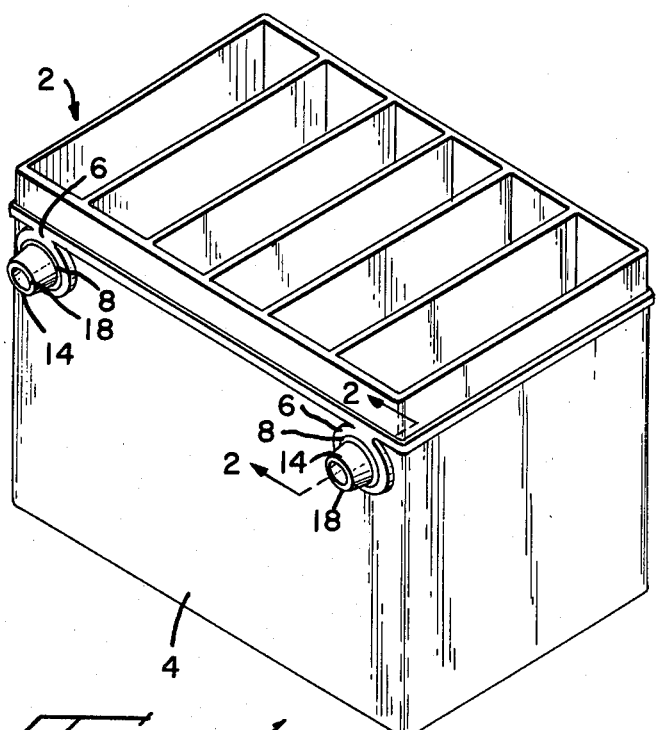
FIG. 1, is an orthographic projection of a battery case having side terminals according to the instant invention.
Figure 2:
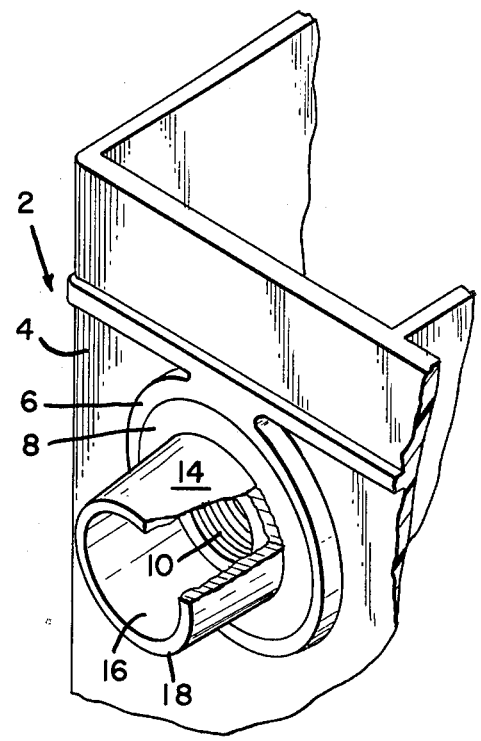
FIG. 2, is an exploded view of one side terminal with a partial section.

Referring now to FIG. 1, there is shown a battery case 2, which is of the variety generally known as a side terminal battery. This type of battery has a generally smooth upper surface and the terminal for making the electrical interconnections are positioned on the side of the battery case generally in the area just below the top of the battery case. The side wall 4 of the battery case is generally planar and has thereon two shoulders 6. These shoulders are positioned one behind each terminal and are intended to strengthen the battery case in the are of the terminal. The permanent side terminal 8, in the flat terminal configuration, has the appearance of a flat washer. Located in the center of the flat terminal, in the area which would be the hole through the flat washer, is a threaded insert 10. The insert 10 is intended to accept a mechanical fastening device which will draw a battery cable connector, not shown, into intimate contact with side terminal 8, when the battery is put to its intended use. The temporary terminal 14 is cast integral with and adjacent the flat washer like portion. In the side terminal post battery, the final permanent terminal would extend from shoulder 6 generally as shown.

The temporary terminal 14 may be cast according to the dimensions of a positive terminal, generally the larger, or a negative terminal, generally the smaller. By casting the terminal 14 according to the dimensions of the positive or negative terminals which are generally found on top terminal batteries, it is possible to connect the forming and charging equipment directly to the terminal 14 in the same manner as would be normally used in attaching the equipment to a top terminal battery.

The temporary terminal 14, has a hollow core 16, which extends into the plane of a permanent terminal 8. In this manner it can be seen that the insert means 10 is preserved free of extraneous lead in the casting operation and is not marred by the use of the temporary side terminal.

The thickness of wall 18, in casting a temporary side terminal 14, is variable and as may be appreciated could be modified in view of different current carrying requirements.

Figure 3:
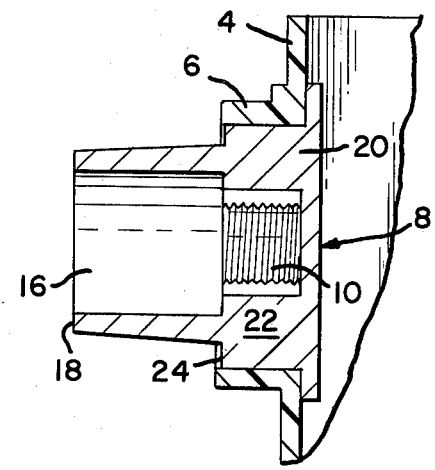
FIG. 3 is a section taken along the lines 2—2 of FIG. 1.

Referring now to FIG. 3, there is the section through the lines 2—2 of FIG. 1. Battery case 2 has side wall 4 and shoulder portion 6 which define a passageway through the wall of the battery case. The side terminal 8 is cast with a shoulder portion 20 which extends completely around the terminal body 22 and abuts the interior of side wall 4 in a sealing relationship with the passage therethrough. The body portion 22 of the terminal extends through the side wall to a point just within the plane defining the outer edge of the shoulder 6. It is the outer edge 24 of the body portion 22 which is seen as a flat washer like portion of the side terminal 8 in FIG. 1.

As previously stated in the forming and charging operation performed in the manufacture of a lead acid storage battery, the side terminal battery would have cast thereon a temporary positive and negative posts as described above. This permits the use of standard forming and charging equipment, as used on top terminal batteries during the forming and charging operations. After completing the manufacturing operations, temporary terminal 14 may be machined from the permanent side terminal. The removal of the temporary terminal in this manner eliminates the need to perform the buffing operation which is undertaken in the prior art to present the end user with a flat side terminal free and clear of any manufacturing scars, such as caused by using an adaptor terminal.

Figure 4:
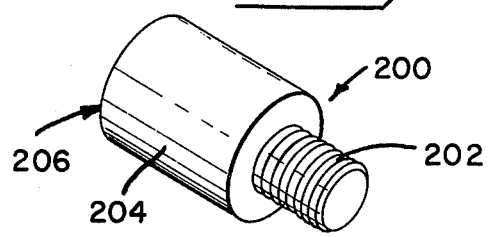
FIG. 4 is an orthographic projection of a plug suitable for use in adapting the temporary side terminal for use in a side post terminal battery.

Referring now to FIG. 4, there is shown the plug 200. The plug 200 has a forward threaded portion 202 which is dimensioned to complement the insert 10 and to form a mechanical-electrical connection in therewith. The shank 204 of the plug 200 is dimensioned to fit snugly within the core 16 and has a length substantially equal to the height of wall 18. Thus, when the plug 200 is placed in the terminal and secured, surface 206 will lie substantially in the plane of the free end of wall 18.

Figure 5:
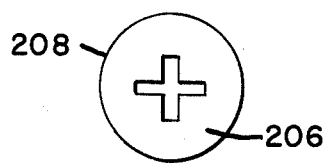
FIG. 5 is a plan view of the top of an plug which shows the positive terminal identification.
Figure 5A:
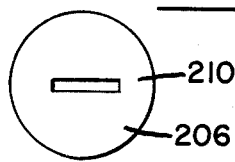
FIG. 5a is a view showing the negative terminal insertion.

Referring now to FIGS. 5 and 5a, there is shown a preferred configuration to the surface 206 of insert 200. FIG. 5 shows the plus sign which is normally associated with the positive terminal and FIG. 5a shows the negative sign normally associated with the negative terminal. The positive indices 208 and the negative indices 210 are cast into the surface 206 by approximately 1/16 of an inch. This provides a means for securing a complementary wrench to the insert 202 to mechanically fasten it to the terminal. And is similar in use to an Allen head bolt. It will be obvious that other mechanical fastening means may be provided, however, it is believed that the use of the positive and negative indices provides further identification of the terminals for the end user. It should be mentioned at this point, that it is recognized that the terminal 14 as shown in FIG. 1 may be used without the insert 100 by providing sufficient material in the wall 18 to resist crushing and end use. However, this would require the casting of terminal 14 with lead in excess of that which is necessary for the forming operation and would increase the overall cost of use in the flat side terminal battery. An additional consideration, is a consumer resistance to purchasing an unconventional looking side post terminal battery.

Figure 6:
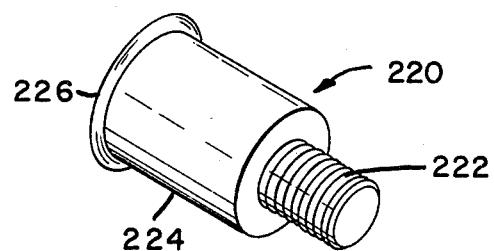
FIG. 6 is a orthographic projection of a plug which includes a shoulder portion thereon.

While recognizing that the plug 200, as shown in FIG. 4, is adequate for mechanical and electrical purposes, it is recognized that the consumer may demand a side post terminal battery which, in appearance, is substantially identical to the one being replaced. In this light, the embodiment shown in FIG. 6, and generally denoted as 220, has a forward portion 222 which is similar to portion 202, a shank portion 224 which is similar to shank portion 204. However, the plug 220 also provides a cap which is dimensioned to fit over the free end of the terminal 18 and to compliment the outside diameter of the wall 18. The cap 226 is provided with slightly rounded edges so that the end product would appear to be substantially identical to the solid or one piece battery post terminal. The only visual difference would be the slight ring which would appear just proximate to the free end of the battery terminal. Again the plug 220 could have mechanical fastening means as shown in FIGS. 5 and 5a.

Having fully disclosed our invention it will be noted that the disclosed terminal may be modified without departing from the spirit of the invention.

I claim:

1. A terminal in a storage battery having a post terminal in the side wall for achieving electrical interconnection, said terminal comprising:
   (a) a terminal cast integrally with and depending from a generally flat terminal having a body portion cast about an insert means, said terminal having an outer surface which extends outwardly into space beyond said flat terminal body portion, and a passageway which extends from a free end through to said insert means, and
   b. plus means, having a first portion for attachment to said insert means and a second portion dimensioned to be received in said passageway,
   c. said terminal being readily removed wherein said storage battery utilizes a flat side terminal, and alternatively,
   d. the use of said plug means with said terminal enables said storage battery to utilize a post side terminal.

2. The terminal of claim 1, wherein said terminal is cast directly in a molded container used for manufacturing said storage battery.

3. The terminal of claim 1, wherein the container used for manufacturing said storage battery is molded about said side terminal.

4. The terminal of claim 1, wherein said second portion is dimensioned to compliment said passageway.

5. The terminal of claim 1, wherein said plug means further comprises a cap means dimensioned to compliment said free end.

6. A storage battery apparatus which may be varied for use as a flat side or a post side comprising:
   a. a terminal cast integrally with and depending from a generally flat terminal having a body portion cast about an insert means,
   b. said terminal projecting outwardly into space a distance from said flat terminal, and c. including a passageway which extends throughout said projection, d. plug means, having a first portion for attachment to said insert means and a second portion to be received in said passageway when the said storage battery utilizes a permanent post side terminal, and e. removing said terminal projection when said storage battery utilizes a flat side terminal.

* * * * *